No. 776,694. PATENTED DEC. 6, 1904.
J. SCHNORR.
MACHINE BELT FASTENER.
APPLICATION FILED MAY 8, 1903.
NO MODEL.
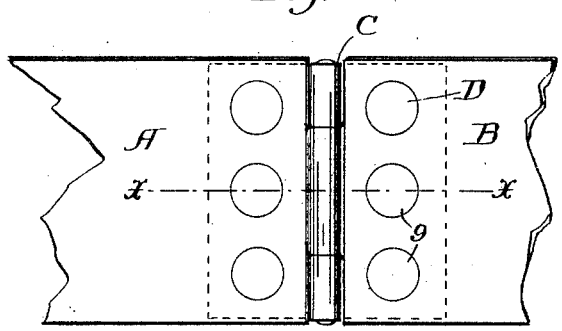
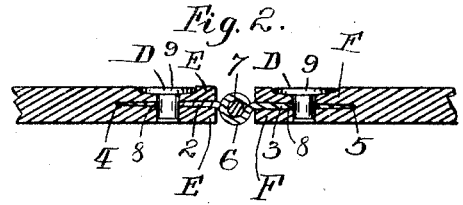
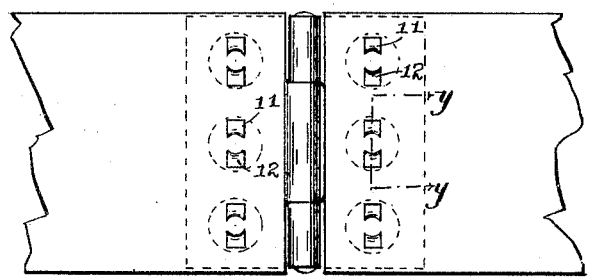
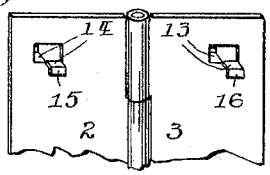 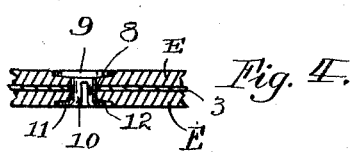 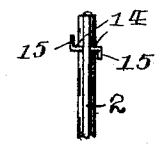
Witnesses:
E. M. Boesel.
U. H. Williams.
Inventor:
Joseph Schnorr,
by Stryker & Bradbury
Attorneys.

No. 776,694. Patented December 6, 1904.

UNITED STATES PATENT OFFICE.

JOSEPH SCHNORR, OF NORTH ST. PAUL, MINNESOTA.

MACHINE-BELT FASTENER.

SPECIFICATION forming part of Letters Patent No. 776,694, dated December 6, 1904.

Application filed May 8, 1903. Serial No. 156,152. (No model.)

*To all whom it may concern:*

Be it known that I, JOSEPH SCHNORR, a citizen of the United States of America, and a resident of North St. Paul, in the county of Ramsey and State of Minnesota, have invented certain new and useful Improvements in Machine-Belt Fasteners, of which the following is a specification.

My invention relates to improvements in machine-belt fasteners, its object being to provide simple, durable, and inexpensive means for fastening the ends of machine-belts together.

A further object is a fastener which may be easily attached to the belt.

To these ends my invention consists, primarily, of a hinge-fastener, the leaves of which are inserted between the flaps of the belt and attached thereto.

In the accompanying drawings, forming part of this specification, Figure 1 is a perspective view of my invention, showing the laps of the belt attached together by my improved fastener. Fig. 2 is a sectional view of Fig. 1, taken on the line X X. Fig. 3 is a plan view of Fig. 1 looking toward the opposite side of the belt. Fig. 4 is a detail sectional view taken on the line Y Y of Fig. 3, and Figs. 5 and 6 are detail views of an alternate construction of belt-fastener.

In the drawings, let A and B represent the laps of a leather belt, and C my improved fastener, by which said laps are connected together. The fastener is in the form of a hinge having the leaves 2 and 3, which taper toward their edges 4 and 5. The leaves are joined together at 6 by means of the pintle 7, the ends of which are upset to prevent it dropping out of place. The leaves are perforated at 8. To attach the hinge to the laps of the belt, each lap is slit across its end and formed with a pair of flaps E and a pair F, as shown in Fig. 2. The leaves of the hinge are then placed between the flaps of each end of the belt and rivets D are fastened through the flaps and perforations, as shown in Fig. 4. I have shown a rivet in the drawings which is particularly adapted for use for this purpose; but I do not wish to confine myself to this specific construction, for other means may be used for accomplishing the same result without departing from the spirit of this invention. This rivet has a large flat head 9 and a split shank 10, the sections 11 and 12 of which are bent back against the surface of the belt when used.

In operation the belt is adjusted upon the pulley in the ordinary manner. The ends of the belt are then slit, as above described, and the leaves of the hinge placed between the flaps of each end. The rivets D are then inserted through the flaps and the perforations in the leaves of the hinge and the sections of the split shanks of the rivets are clenched on the surface of the belt.

It is immaterial which side of the belt is placed next the pulleys, for the rivets present smooth surfaces on either side. The belt is thus equally efficient when used for driving from both surfaces at the same time. The hinged joint formed by the fastener presents a smooth and flexible working surface.

In the alternate construction the leaves 2 and 3 are formed with hooks 13 and 14, which project from the sides of each leaf. These hooks are passed through the flaps of the belt and their ends 15 and 16 clenched. By means of this construction a strong and durable fastener is produced and the use of rivets obviated.

Having described my invention, what I claim as new, and desire to protect by Letters Patent, is—

1. A device of the class set forth, consisting of a pair of leaves having suitable openings, a belt having flaps at its abutting ends, between which said leaves are held, a pintle connection between said leaves, and rivets not greater in length than the thickness of the body portion of the belt passing through said flaps and openings; said flaps and leaves being substantially equal in total thickness to the body portion of the belt.

2. A device of the class set forth, consisting, in combination, of a pair of leaves, a belt having a pair of flaps at its abutting ends, between which said leaves are held, a pintle connection between said leaves, and means for fastening said leaves to said flaps, the sides of the abutting ends of said belt resting in substantially the same planes as those of the corresponding sides of the body portion of the belt.

3. A device of the class set forth, consisting, in combination, of a hinge having a pair of tapering leaves, a belt having each of its laps slit across its end to form flaps, between which said leaves are held, means for fastening said leaves to said flaps, and a pintle connection between said leaves; each flap having its face in substantially the same plane as the adjacent face of the body portion of the belt.

4. A device of the class set forth, consisting of leaves 2 and 3, having perforations 8, a belt having a pair of flaps at each of its abutting ends, between which said leaves are held, rivets 10 passing through said leaves and flaps and of length not greater than the thickness of the body portion of the belt, and a pintle 7 between said leaves; each of said pairs of flaps with its leaf between being substantially equal in total thickness to the body portion of the belt.

5. A device of the class set forth, consisting of a hinge having a pair of leaves, a belt having flaps at each of its abutting ends, between which said leaves are held, and means for fastening said leaves to said flaps; the faces of said flaps lying in substantially the same planes as those of the adjacent faces of the body portion of the belt.

In testimony whereof I have signed my name to this specification in the presence of two subscribing witnesses.

JOSEPH SCHNORR.

Witnesses:
  E. M. BOESEL,
  F. S. BRADBURY.